United States Patent
Kilibarda

(10) Patent No.: US 8,713,780 B2
(45) Date of Patent: May 6, 2014

(54) HIGH DENSITY WELDING SUBASSEMBLY MACHINE

(75) Inventor: Velibor Kilibarda, Southfield, MI (US)

(73) Assignee: Comau, Inc., Southfield, MI (US)

( * ) Notice: Subject to any disclaimer, the term of this patent is extended or adjusted under 35 U.S.C. 154(b) by 1481 days.

(21) Appl. No.: 12/269,955

(22) Filed: Nov. 13, 2008

(65) Prior Publication Data

US 2009/0285666 A1    Nov. 19, 2009

Related U.S. Application Data

(60) Provisional application No. 61/052,764, filed on May 13, 2008.

(51) Int. Cl.
*B23P 11/00* (2006.01)

(52) U.S. Cl.
USPC .................................. 29/430; 29/428; 29/429

(58) Field of Classification Search
USPC .................................................. 29/428–431
See application file for complete search history.

(56) References Cited

U.S. PATENT DOCUMENTS

| | | |
|---|---|---|
| 3,854,889 A | 12/1974 | Lemelson |
| 4,232,370 A | 11/1980 | Tapley |
| 4,328,422 A | 5/1982 | Loomer |
| 4,369,563 A | 1/1983 | Williamson |
| 4,442,335 A | 4/1984 | Rossi |
| 4,530,056 A | 7/1985 | MacKinnon et al. |
| 4,600,136 A | 7/1986 | Sciaky |
| 4,659,895 A | 4/1987 | Di Rosa |
| 4,667,866 A | 5/1987 | Tobita et al. |
| 4,679,297 A | 7/1987 | Hansen, Jr. et al. |
| 4,734,979 A | 4/1988 | Sakamoto et al. |
| 4,736,515 A | 4/1988 | Catena |
| 4,738,387 A | 4/1988 | Jaufmann et al. |
| 4,779,787 A | 10/1988 | Naruse et al. |
| 4,795,075 A | 1/1989 | Pigott et al. |
| 4,800,249 A | 1/1989 | Di Rosa |

(Continued)

FOREIGN PATENT DOCUMENTS

| | | |
|---|---|---|
| DE | 19806963 A1 | 10/1998 |
| EP | 0261297 A1 | 3/1988 |

(Continued)

OTHER PUBLICATIONS

FMC; Automated Fork lifts and Material Handling Lifts—Forked Automated Guided Vehicles; http://www.fmcsgvs.com/content/products/forked_vehicles.htm; p. 1.

(Continued)

*Primary Examiner* — Richard Chang
(74) *Attorney, Agent, or Firm* — Young Basile Hanlon & MacFarlane P.C.

(57) ABSTRACT

An apparatus for welding motor vehicle body component subassemblies at a weld station. First and second pallets are arranged for reciprocal movement between a load/unload station and the weld station and the pallets are alternately moved from a load/unload station to the weld station while the other pallet is moved from the weld station to a load/unload station. Each pallet has a plurality of substations for receipt of component subassemblies and, while each pallet is at the load/unload station, the component subassembly at each substation is moved to the next successive substation and a further component is added to the moved component.

8 Claims, 11 Drawing Sheets

(56) References Cited

U.S. PATENT DOCUMENTS

| | | | |
|---|---|---|---|
| 4,815,190 | A | 3/1989 | Haba, Jr. et al. |
| 5,011,068 | A | 4/1991 | Stoutenburg et al. |
| 5,319,840 | A * | 6/1994 | Yamamoto et al. ............. 29/430 |
| 5,347,700 | A | 9/1994 | Tominaga et al. |
| 5,397,047 | A | 3/1995 | Zampini |
| 5,427,300 | A | 6/1995 | Quagline |
| 5,560,535 | A | 10/1996 | Miller et al. |
| 5,577,595 | A | 11/1996 | Pollock et al. |
| 5,902,496 | A | 5/1999 | Alborante |
| 5,940,961 | A | 8/1999 | Parete |
| 5,943,768 | A | 8/1999 | Ray |
| 6,059,169 | A | 5/2000 | Nihei et al. |
| 6,065,200 | A | 5/2000 | Negre |
| 6,098,268 | A | 8/2000 | Negre |
| 6,138,889 | A | 10/2000 | Campani et al. |
| 6,170,732 | B1 | 1/2001 | Vogt et al. |
| 6,193,142 | B1 * | 2/2001 | Segawa et al. ................ 219/148 |
| 6,250,533 | B1 | 6/2001 | Otterbein et al. |
| 6,324,880 | B1 | 12/2001 | Nakamura |
| 6,336,582 | B1 | 1/2002 | Kato et al. |
| 6,457,231 | B1 | 10/2002 | Carter et al. |
| 6,467,675 | B1 | 10/2002 | Ozaku et al. |
| 6,516,234 | B2 | 2/2003 | Kamiguchi et al. |
| 6,564,440 | B2 | 5/2003 | Oldford et al. |
| 6,744,436 | B1 | 6/2004 | Chirieleison, Jr. et al. |
| 6,799,673 | B2 | 10/2004 | Kilabarda |
| 6,948,227 | B2 | 9/2005 | Kilibarda et al. |
| 7,331,439 | B2 | 2/2008 | Degain et al. |
| 7,546,942 | B2 | 6/2009 | Monti et al. |
| 8,308,048 | B2 | 11/2012 | Kilibarda |
| 2003/0037432 | A1 | 2/2003 | McNamara |
| 2003/0057256 | A1 | 3/2003 | Nakamura et al. |
| 2003/0115746 | A1 | 6/2003 | Saito et al. |
| 2003/0188952 | A1 | 10/2003 | Oldford et al. |
| 2003/0189085 | A1 | 10/2003 | Kilibarda et al. |
| 2004/0020974 | A1 | 2/2004 | Becker et al. |
| 2004/0216983 | A1 | 11/2004 | Oldford et al. |
| 2004/0221438 | A1 | 11/2004 | Savoy et al. |
| 2005/0008469 | A1 | 1/2005 | Jung |
| 2005/0035175 | A1 | 2/2005 | Nakamura et al. |
| 2005/0120536 | A1 | 6/2005 | Kilibarda et al. |
| 2005/0189399 | A1 | 9/2005 | Kilibarda |
| 2005/0230374 | A1 | 10/2005 | Rapp et al. |
| 2005/0236461 | A1 | 10/2005 | Kilibarda et al. |
| 2005/0269382 | A1 | 12/2005 | Caputo et al. |
| 2006/0157533 | A1 | 7/2006 | Onoue et al. |
| 2007/0164009 | A1 | 7/2007 | Hesse |
| 2008/0061110 | A1 | 3/2008 | Monti et al. |
| 2008/0084013 | A1 | 4/2008 | Kilibarda |
| 2008/0105733 | A1 | 5/2008 | Monti et al. |
| 2008/0116247 | A1 | 5/2008 | Kilibarda |
| 2008/0131255 | A1 | 6/2008 | Hessler et al. |
| 2008/0295335 | A1 | 12/2008 | Kilibarda et al. |
| 2009/0078741 | A1 | 3/2009 | Sata et al. |
| 2009/0285666 | A1 | 11/2009 | Kilibarda |
| 2010/0301099 | A1 | 12/2010 | Sata et al. |

FOREIGN PATENT DOCUMENTS

| | | |
|---|---|---|
| EP | 0446518 A1 | 9/1991 |
| EP | 1403176 A2 | 3/2004 |
| GB | 2250723 A | 6/1992 |
| WO | 8603153 A | 6/1986 |
| WO | 2006109246 A1 | 10/2006 |

OTHER PUBLICATIONS

FMC; SGV (Self Guided Vehicles)—Automated Guided Vehicle Systems; http://www.fmcsgvs.com/content/products/sgv.htm, p. 1.

FMC; Automated Material Handling Systems & Equipment for Material Movement: AGV Applications; http://www.fmcsgvs.com/content/sales/applications.htm; pp. 1-2.

FMC; Layout Wizard AGV Configuration Software; http://fmcsgvs.com/content/products/wizard.htm; p. 1.

FMC; AGV System Controls; http://www.fmcsgvs.com/content/products/system.htm; p. 1.

FMC; Laser Navigation Controls; http://www.fmcsgvs.com/content/products/nav.htm; pp. 1-2.

European Search Report dated Apr. 19, 2011 from the corresponding European Patent Application No. 11152656.2-2302.

European Search Report dated Aug. 28, 2009 from the corresponding European Patent Application No. 09158794.9-2302.

* cited by examiner

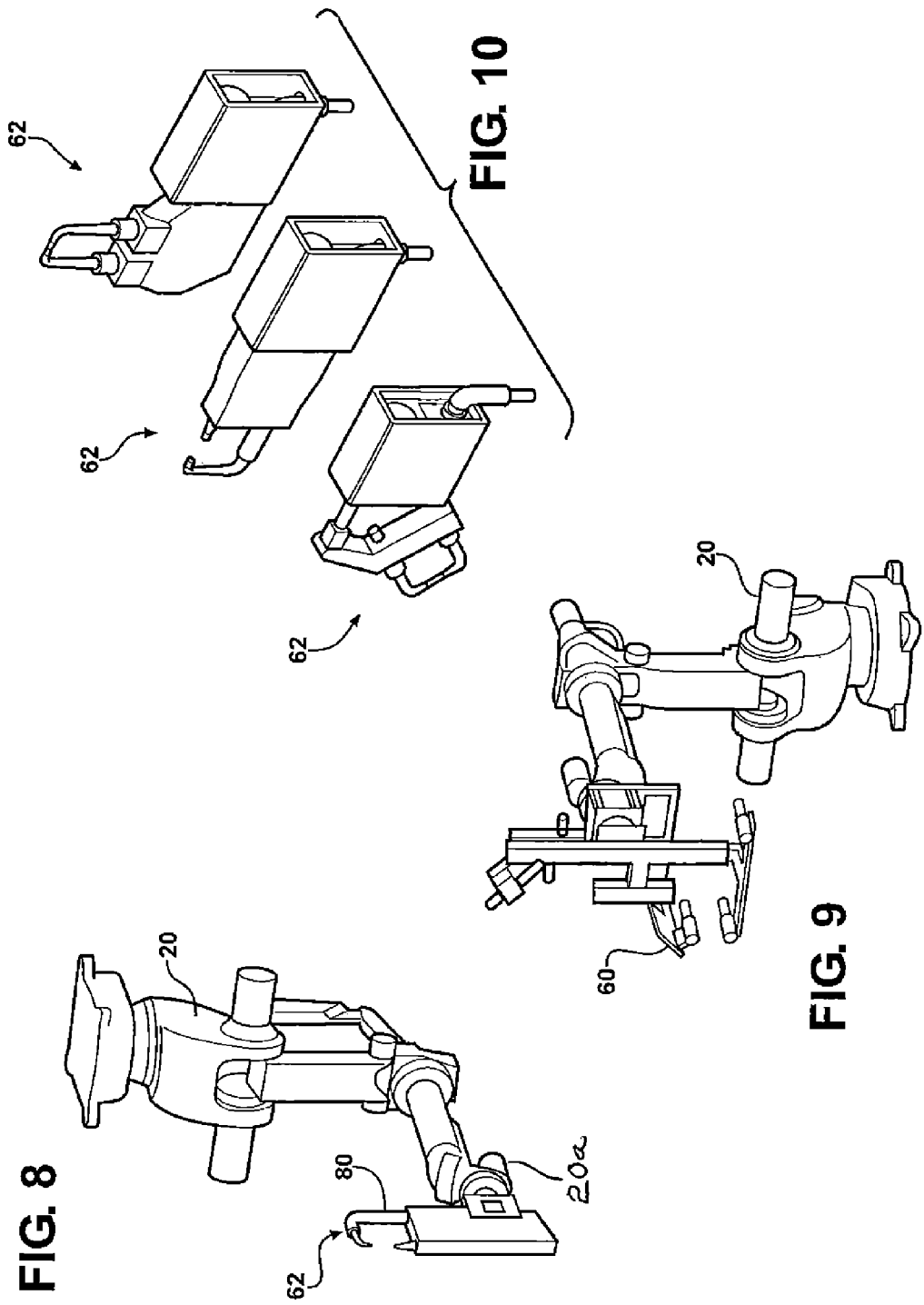

HIGH DENSITY WELDING SUBASSEMBLY MACHINE

CROSS-REFERENCE TO RELATED APPLICATION

This application claims the benefit of U.S. provisional patent application Ser. No. 61/052,764 filed May 13, 2008.

BACKGROUND OF THE INVENTION

This invention relates to motor vehicle manufacturing and more particularly to a high density welding machine to facilitate manufacture of subassembly components of motor vehicle bodies.

In the mass production of motor vehicles on an assembly line basis, it is imperative that the various subassembly components come together for the final assembly process in an efficient and orderly manner. The current subassembly procedures, while generally satisfactory, tend to be manpower-intensive, tend to require large amounts of factory floor space, sometimes present maintenance complications, require excessive capital expenditures, and may present safety and/or environmental concerns.

SUMMARY OF THE INVENTION

The present invention is directed to the provision of an improved high density welding subassembly machine for motor vehicle applications.

More specifically, the present invention is directed to a high density welding subassembly machine requiring minimal factory floor space, requiring minimal operational manpower, requiring a relatively low initial capital investment, providing easy maintenance, and minimizing safety and environmental concerns.

The invention provides a method of welding motor vehicle components at a weld station. The method comprises providing a pallet having a plurality of successive substations for receipt of component subassemblies; reciprocally moving the pallet back and forth between a load/unload station and the weld station; while the pallet is at the load/unload station, moving the component subassembly at each substation to the next successive substation and adding a further component to each moved component subassembly; and while the pallet is at the weld station, welding each component subassembly at each substation of the pallet.

According to a further feature of the invention methodology, the weld station substations includes a plurality of substations corresponding to the plurality of substations; as the pallet arrives at the welding station, the pallet substations are aligned respectively with the weld station substations; and a welding operation is performed at each welding station substation unique to the component subassembly positioned on the pallet at the weld station substation.

According to a further feature of the invention methodology, the steps of moving the pallet back and forth between the weld station and the load/unload station, welding each component subassembly at each substation of the pallet while the pallet is at the weld station, and moving each welded component subassembly to the next successive weld station of the pallet and adding a further component to the moved subassembly while the pallet is at the load/unload station, are repeated until a final welded subassembly is presented at the final substation with the pallet positioned at the load/unload station, whereafter the final welded subassembly is removed from the pallet for use in further motor vehicle assembly processes.

According to a further feature of the invention methodology, the pallet has at least first, second, and third substations and wherein, as the pallet is positioned at the load/unload station, a subassembly consisting of components A/B/C/D is removed from the third substation; a subassembly consisting of components A/B/C is moved from the second substation to the third substation; a new component D is added to the subassembly A/B/C positioned at the third substation: a subassembly consisting of components A/B is moved from the first substation to the second substation; a new component C is added to the subassembly A/B positioned at the second substation; and new components A and B are loaded onto the first substation.

According to a further feature of the invention methodology, the pallet comprises a first pallet and the method further comprises providing a second pallet reciprocally movable between a load/unload station and the weld station and having a plurality of successive substations for receipt of component subassemblies; alternately moving each pallet from its load/unload station to the weld station while moving the other pallet from the weld station to its load/unload station; and while each pallet is at the load/unload station, moving the component subassembly at each substation to the next succeeding substation and adding a further component to the moved subassembly.

According to a further feature of the invention methodology, each pallet has its own load/unload station and the load/unload stations and the weld station are in linear alignment with the weld station positioned between the load/unload stations.

The invention further provides an apparatus for welding motor vehicle components at a weld station. The apparatus of the invention comprises a weld station; a load/unload station; a pallet mounted for reciprocal movement between the load/unload station and the weld station and having a plurality of successive pallet substations thereon for receipt of component subassemblies; and a transfer system proximate the load/unload station operative with the pallet positioned at the load/unload station to move the component subassembly at each substation to the next successive substation and add a further component to each moved subassembly so that the component subassembly at a particular pallet substation includes one more component than the subassembly at the immediately preceding substation and one less component than the component subassembly at the immediately succeeding substation.

According to a further feature of the invention apparatus, the transfer system includes robotic devices positioned at the load/unload station.

According to a further feature of the invention apparatus, the apparatus further includes a storage structure positioned proximate the load/unload station and storing inventories of components for use in forming the component subassemblies.

According to a further feature of the invention apparatus, the apparatus further includes a conveyor positioned between the storage structure and the load/unload station and including a run positioned proximate the storage structure for receipt of components from inventory and a run proximate the load/unload station for delivery of components to the load/unload station for loading onto the pallet substations by the transfer system.

According to a further feature of the invention apparatus, the pallet includes an initial substation, a final substation, and intermediate substations; the transfer system is operative to move component subassemblies successively from the initial substation to the final substation; and the transfer system is further operative to remove a final welded component subassembly from the final substation for use in further motor vehicle assembly processes.

According to a further feature of the invention apparatus, the load/unload station comprises a first load/unload station, the pallet comprises a first pallet, and the transfer system comprises a first transfer system; and the apparatus further includes a second load/unload station, a second pallet mounted for reciprocal movement between the second load/unload station and the weld station and having a plurality of successive substations, and a second transfer system operative with the second pallet positioned at the second load/unload station to move the component subassemblies at each substation to the next successive substation and add a further component to each moved subassembly.

According to a further feature of the invention apparatus, the apparatus further includes tooling at each pallet substation configured to receive and accurately position the components of the specific component subassembly at that substation.

According to a further feature of the invention apparatus, while one pallet is at its load/unload station for movement of the subassemblies between the successive substations, the other pallet is at the weld station for welding of the component subassemblies at the substations.

BRIEF SUMMARY OF THE DRAWINGS

The description herein makes reference to the accompanying drawings wherein like reference numerals refer to like parts throughout the several views and wherein:

FIGS. 8, 9 and 10 are detail views showing subassembly enablers; and

DETAILED DESCRIPTION OF THE PREFERRED EMBODIMENT

Figure 1:
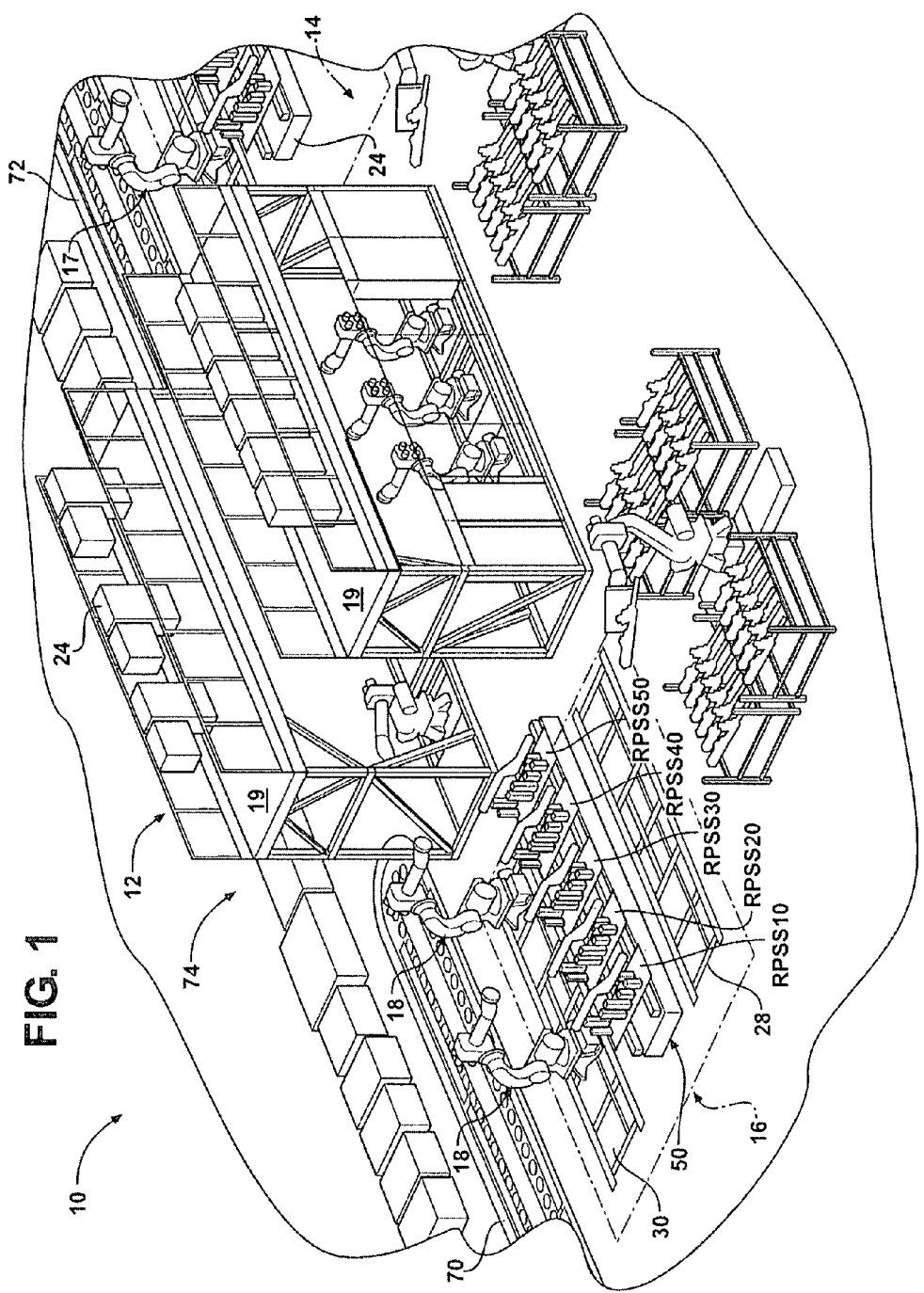
FIG. 1 is a perspective view of the subassembly machine of the invention.

The high density welding subassembly 10 of the invention, broadly considered, includes a weld station 12, a left load/unload station 14, a right load/unload station 16, a left transfer system 17, and a right transfer system 18.

Welding station 12 includes a pair of longitudinally extending, laterally spaced scaffold structures 19 defining a weld area WA therebetween and a plurality of robots 20 supported on the scaffold structure. For example, each scaffold structure may support welding robots positioned on and extending upwardly from the base 21 of the scaffold structure in longitudinally spaced relation and three inverted welding robots extending downwardly from the top wall 22 of the scaffold structure in longitudinally spaced relation. Each scaffold structure 19 further includes leg support structures 23 extending downwardly from the top wall 22 to define an open working space WS below the top wall and the inverted robots 20 carried by the top wall 22 extend downwardly into the working space WS. The lower operative ends 20a of the inverted robots extend into the weld area WA between the laterally spaced scaffold structures for coaction in performing welding or other operations on motor vehicle components positioned in the weld area. The weld station comprises a plurality of successive substations and may, for example, include five substations including a weld station substation 10 (WSS10). WSS20, WSS30, WSS40 and WSS50, each including one or more welding robots and one or more positioning robots. Each scaffold structure further includes suitable control panels 24 positioned on the top walls 22 proximate the outboard faces of the scaffold structures. The number, spacing and functioning of robots at each substation will, of course, vary depending upon the particular application.

Left load/unload station 14 includes a pallet 24 mounted on a base pallet structure 26 for reciprocal powered movement on tracks or rollers between load/unload station 14 and weld station 12 and including a plurality of successive pallet substations corresponding to the weld station substation and including a left pallet substation 10 (LPSS10), LPSS20, LPSS30, LPSS40 and LPSS50. Unique component tooling LAB, LABC, LABCD, LABCDE, and LABCDEF is positioned at the five left pallet substations, respectively.

Left transfer system 17 includes robot base support structures 28/30 on opposite sides of the pallet base structure, spaced load robots 32/34 slidably positioned on robot base structure 28, unload robot 36 slidably positioned on robot base structure 30, and unload robot 38 mounted on robot slide base structure 40 for selective sliding movement toward and away from the pallet structure.

Right load/unload station 16 is similar to station 14 and includes a pallet 50 mounted on a pallet base structure 52 for reciprocal powered movement on tracks or rollers between load/unload station 16 and weld station 12 and including a plurality of successive pallets substations corresponding to the weld station substations and to the left pallet substations and including a right pallet substation 10 (RPSS10), RPSS20, RPSS30, RPSS40, and RPSS50. Unique tooling RAB, RABC, RABCD, RABCDE, and RABCDEF (corresponding respectively to tooling LAB, LABC, LABCD, LABCDE, and LABCDEF) is positioned at the five right pallet substations respectively.

Right, transfer system 18 includes robot base structures 54/56 on opposite sides of the pallet base structure, a pair of longitudinally spaced load robots 58, 60 slidably mounted on the robot base structure 54 and an unload robot 64 mounted on a slide 66 for sliding movement toward and away from the pallet base structure.

Subassembly machine 10 further includes an endless conveyor 70 positioned proximate robot base 28 of left transfer system 17, a further endless conveyor 72 positioned proximate robot base 54 of right transfer system 18, a component inventory storage structure in the form of a row of dunnage containers or racks 74 positioned in outboard relation to conveyors 70, 72, and a plurality of dunnage racks 76 positioned on opposite sides of each slide 40/66.

Endless conveyor 70 includes a run 70a positioned proximate and parallel to inventory containers 74 and a run 70b positioned proximate and parallel to robot base 28. Endless conveyor 72 includes a run 72a positioned proximate and parallel to inventory containers 74 and a run 72b positioned proximate and parallel to robot base 54.

Operation

Figure 2:
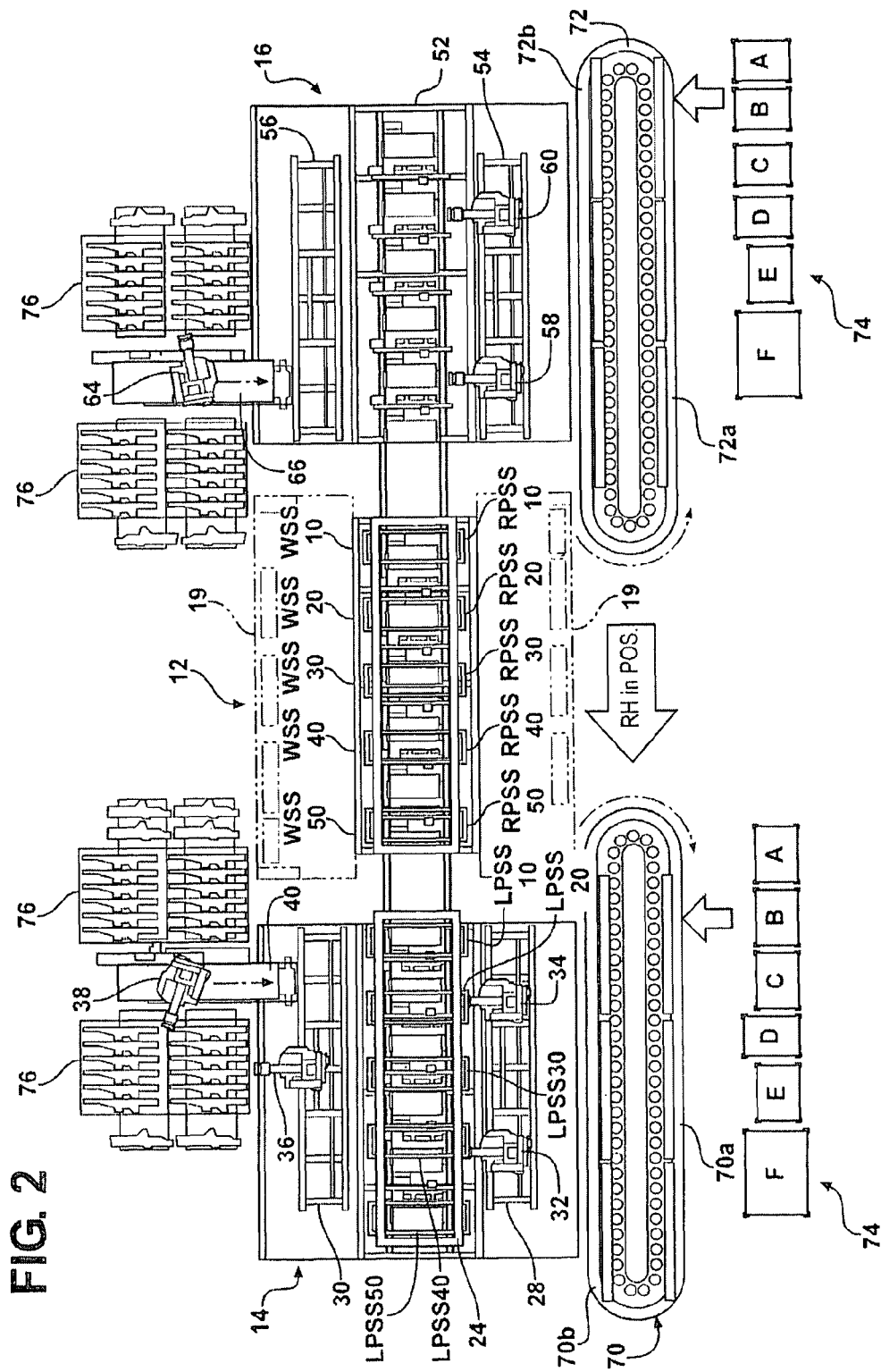
FIGS. 2, 3 and 4 are somewhat schematic views showing steps in the invention methodology.
Figure 3:
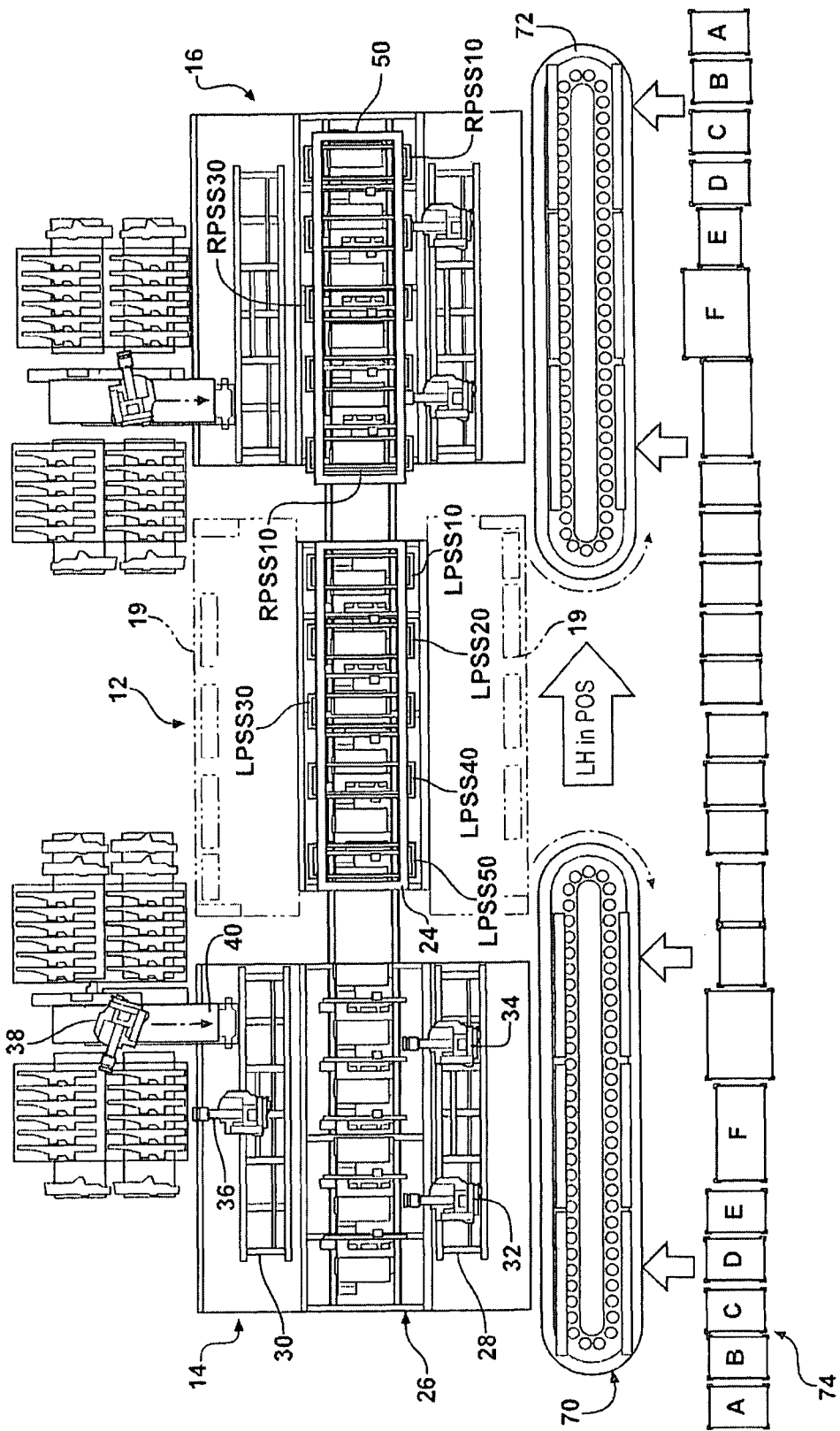
Figure 4:
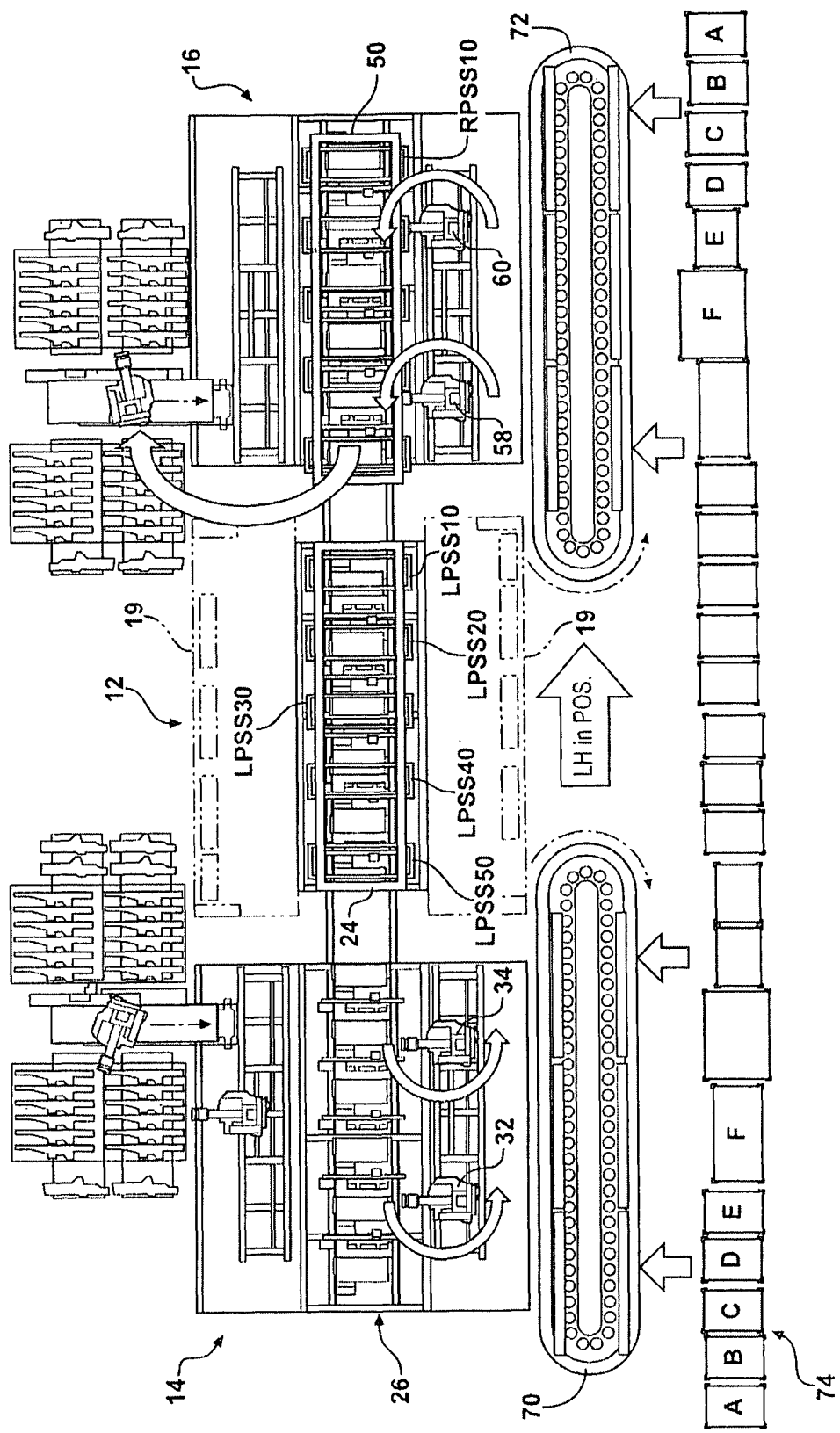
Figure 5:
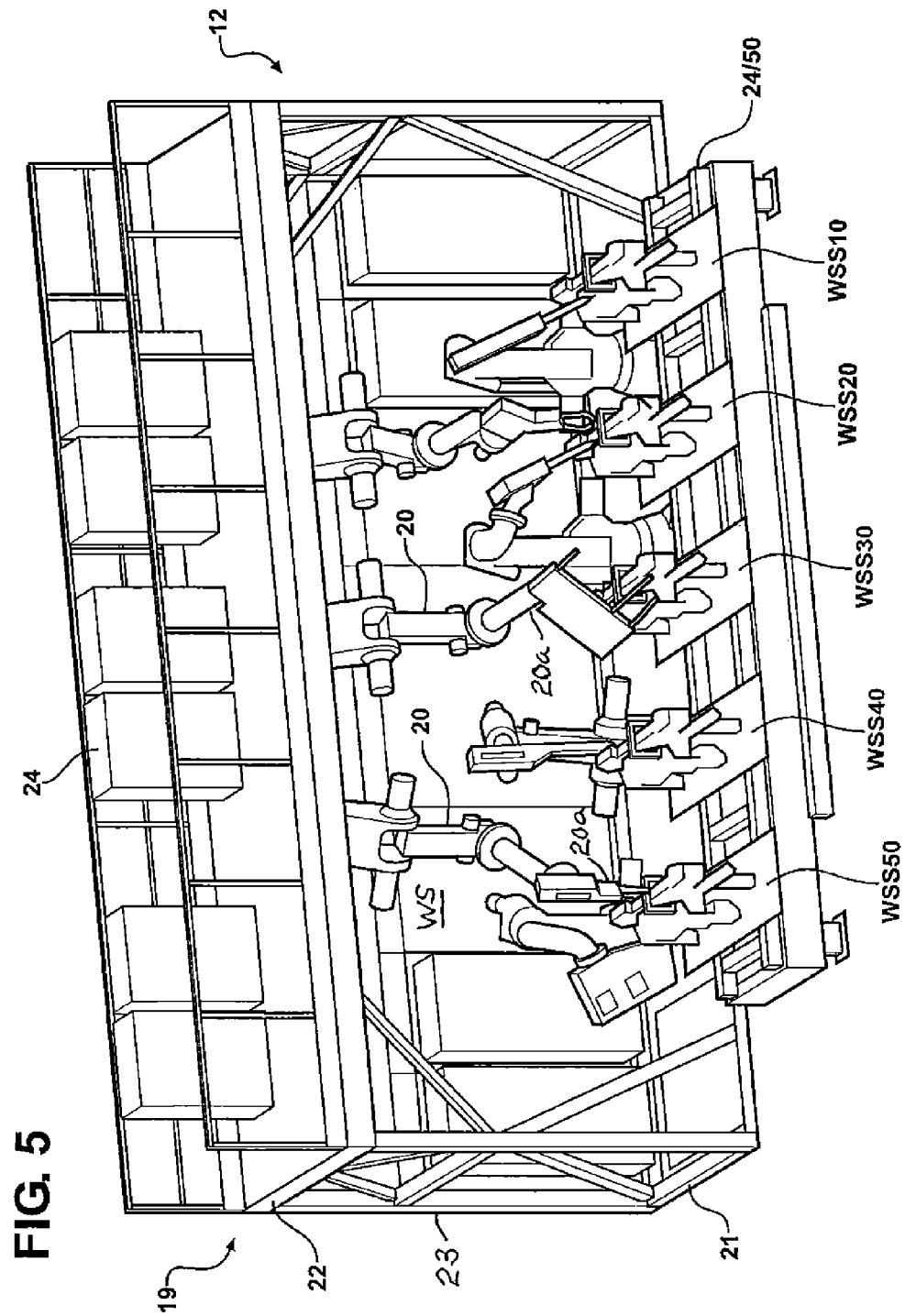
FIG. 5 is a perspective view of a weld station forming a part of the invention welding machine.
Figure 6:
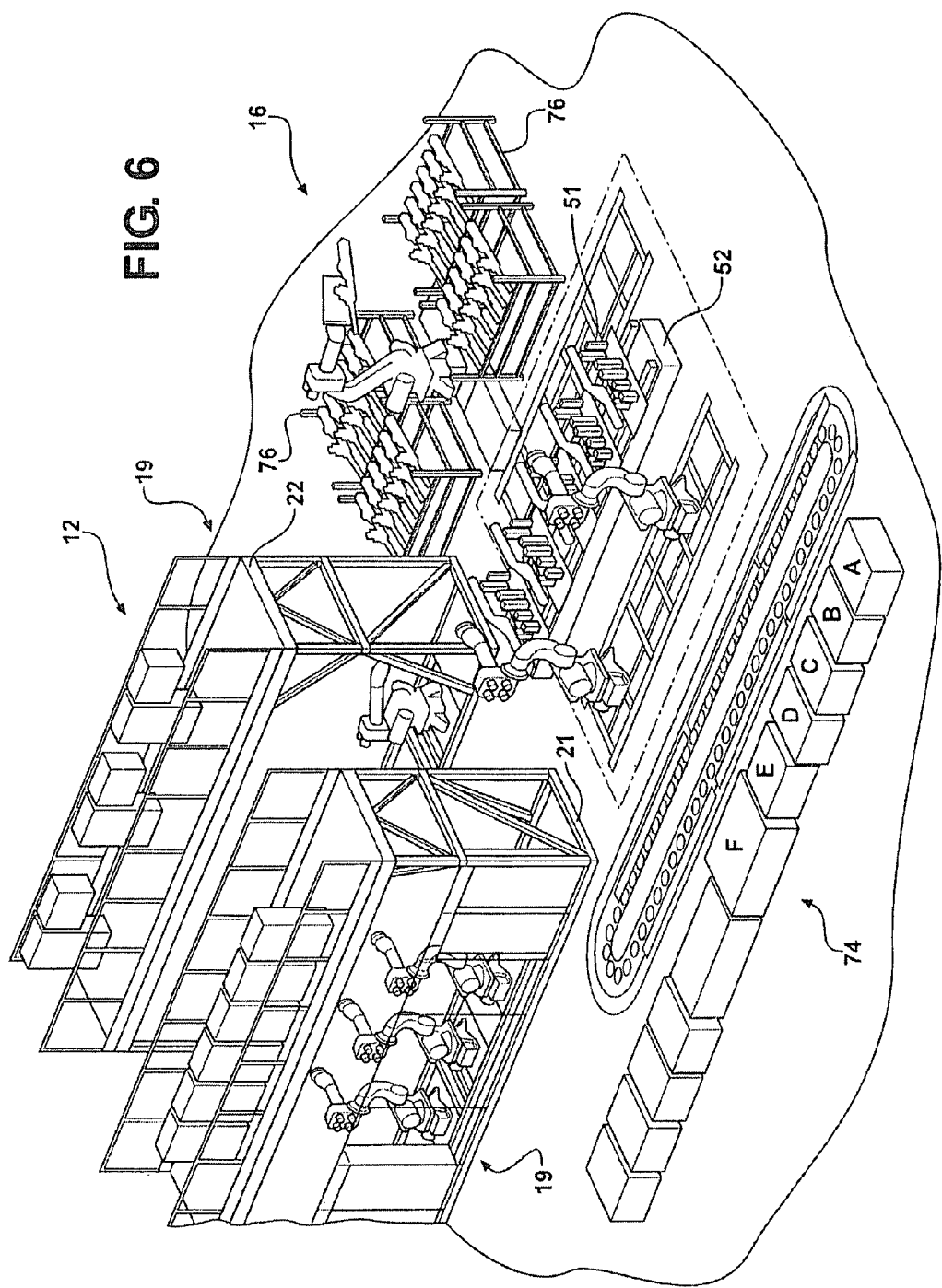
FIG. 6 is a further perspective view of the invention welding machine.
Figure 7:
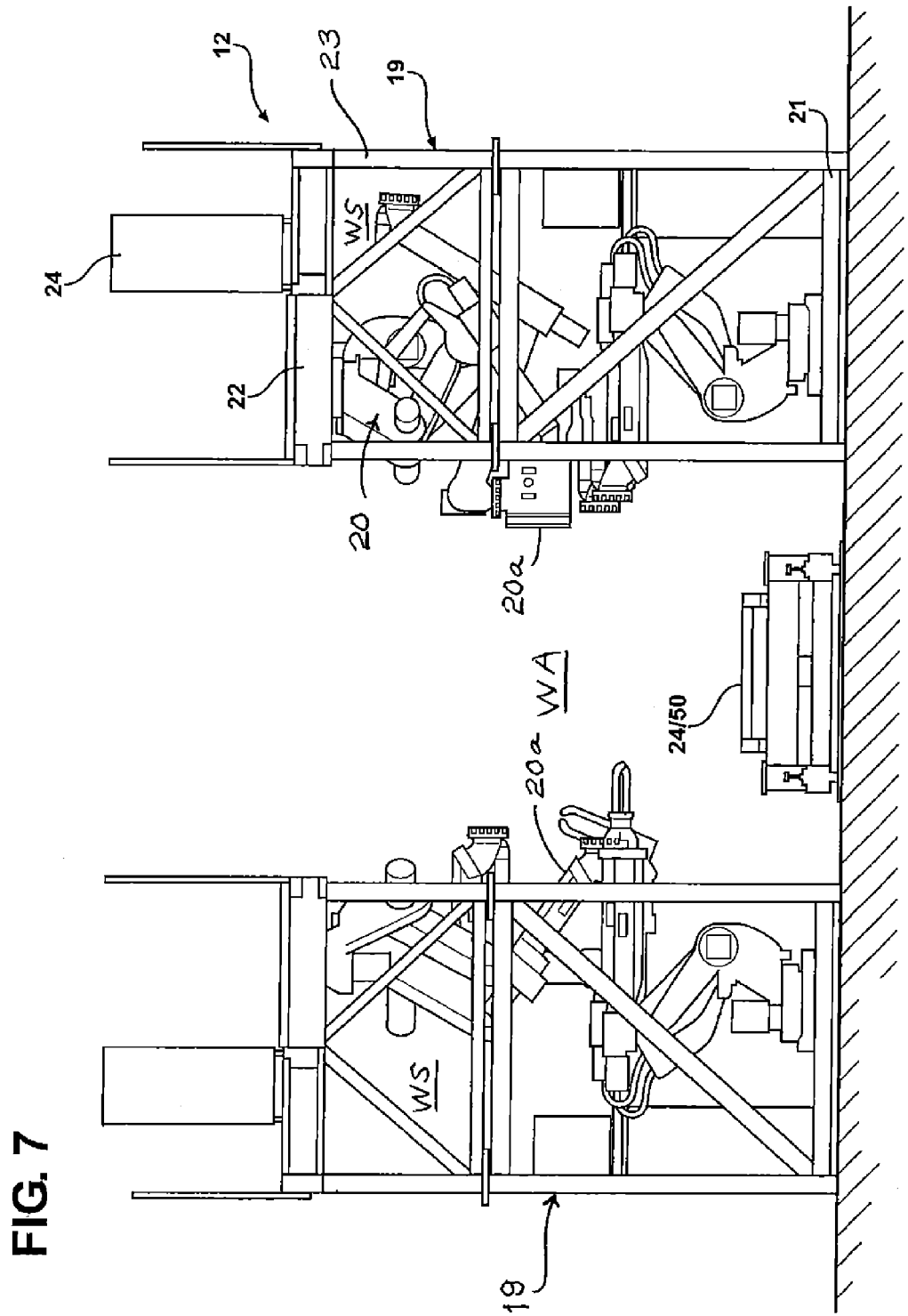
FIG. 7 is an elevational view of the weld station.

In overview, while components on pallet 24 from station 14 are positioned in the weld station for suitable welding operations (FIG. 3), component subassemblies on pallet 50 in the load/unload station 16 are being unloaded and loaded, whereafter, following completion of the welding operations on the components subassemblies positioned on the pallet 24, that pallet is shuttled back to the load/unload station 14 for suitable unloading and loading (FIG. 2) while the component subassemblies on pallet 50 are shuttled to the weld station for suitable welding operations and this sequence is continued until the job in question is completed. To facilitate the shuttling movement of the pallets, the longitudinal center lines of stations 12, 14, 16 are aligned so that the shuttling movement of the pallets is linear straight line and direct.

More specifically, at start-up of a particular job, pallets 24/50 are empty. Initially, and with particular reference to FIGS. 11, 12, 13 and 14, two body sheet metal components A/B are loaded onto substation RPSS10 of pallet 50 utilizing load robots 58/60 receiving parts from conveyor 72, whereafter the pallet is shuttled to the weld station for welding of components A/B at weld station substation WSS10. While this welding operation is occurring, components A/B are loaded onto LPSS10 of pallet 24 utilizing load robots 32/34 retrieving parts from conveyor run 70b. When the welding operation is complete, pallet 50 is shuttled back to station 14 and pallet 24 is moved to the weld station for welding of components A/B at WSS10. As this welding is taking place, welded components A/B are moved to RPSS20, a third component C is added to components A/B at RPSS20 and new components A/B are loaded onto RPSS10, whereafter following completion of the welding, pallet 24 is shuttled back to station 14 and pallet 50 is shuttled to the weld station for welding of components A/B/C at WSS20 and welding of components A/B at WSS10. While this welding is taking place, welded components A/B at LPSS10 of pallet 24 are moved to LPSS20, a third component C is added to components A/B at LPSS20, and new components A/B are loaded onto LPSS10 whereafter, following completion of the welding, pallet 50 is shuttled back to station 16 and pallet 24 is shuttled to the weld station for welding of components A/B/C at WSS20 and welding of components A/B at WSS10. As this welding is taking place, welded components A/B/C at RPSS20 of pallet 50 are moved to RPSS30, a fourth component D is added to welded components A/B/C at RPSS30, welded components A/B at RPSS10 are moved to RPSS20, a third component C is added to welded components A/B at RPSS20, and new components A/B are loaded onto RPSS10.

Figure 11:
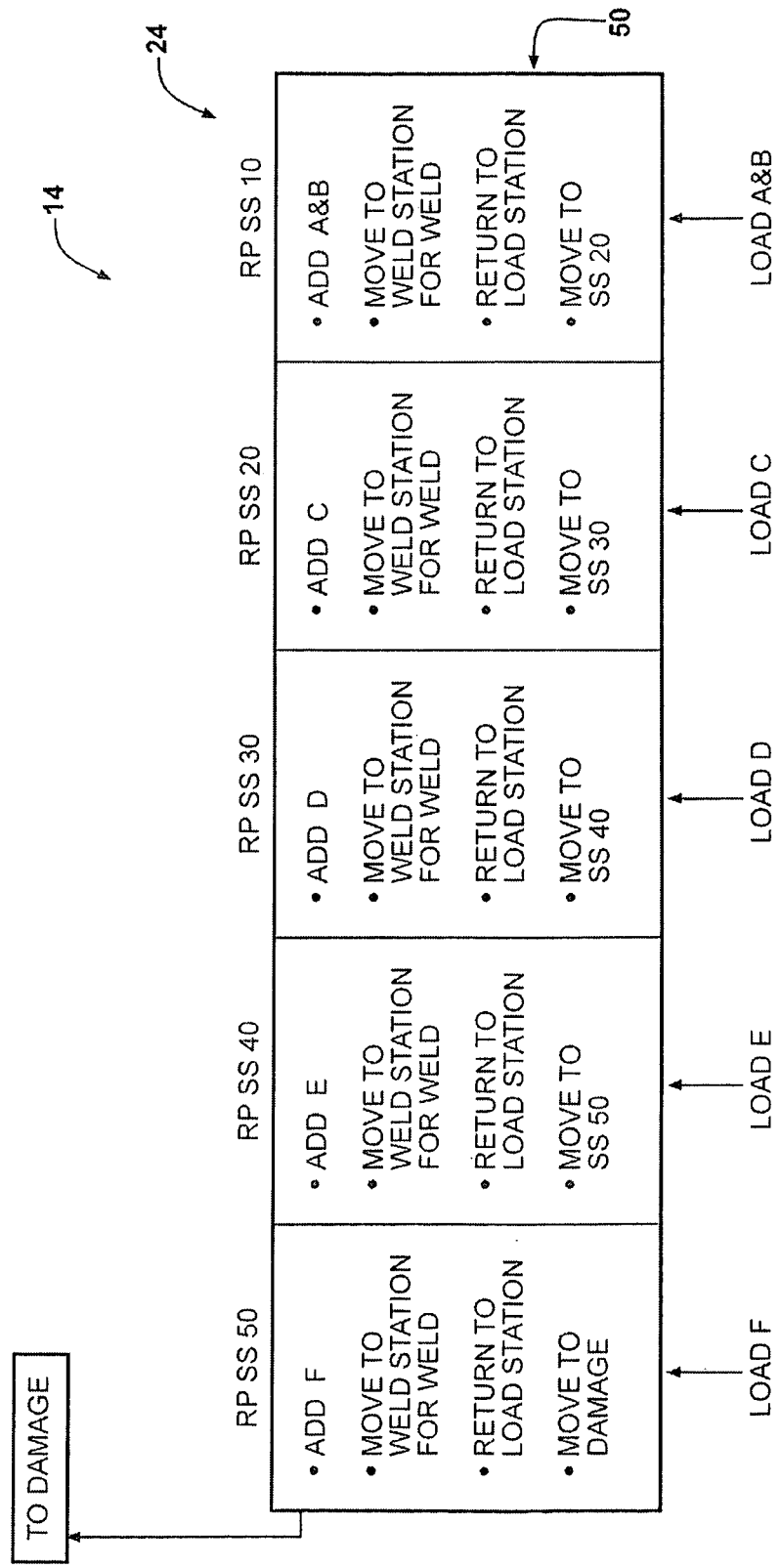
FIGS. 11, 12, 13 and 14 are diagrammatic views illustrating the invention methodology.
Figure 12:
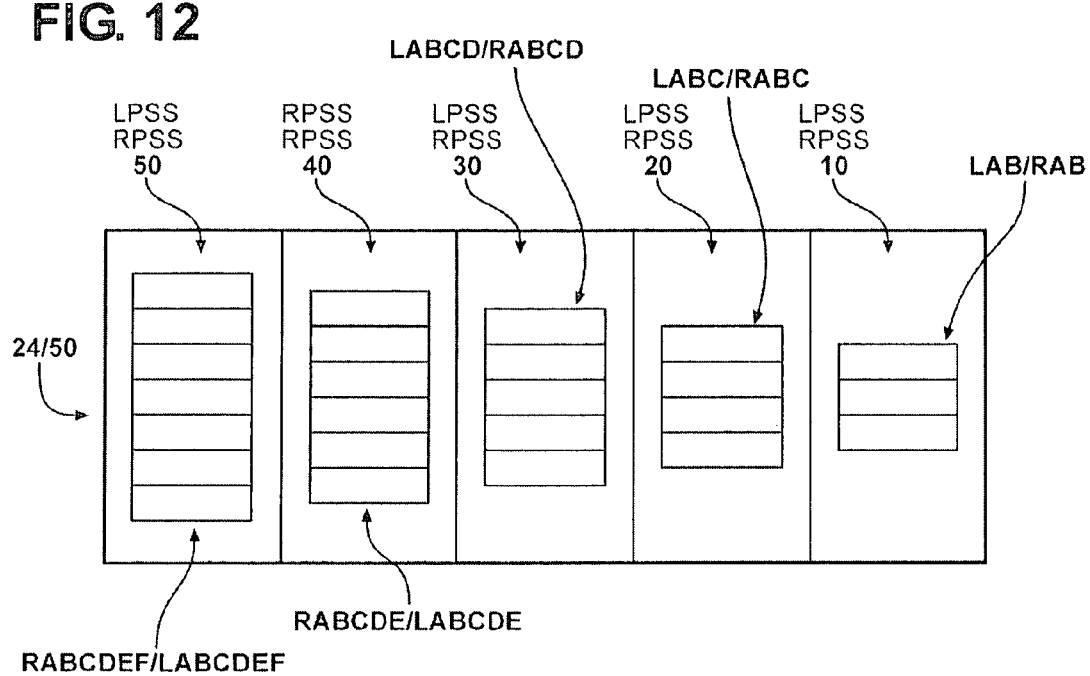
Figure 13:
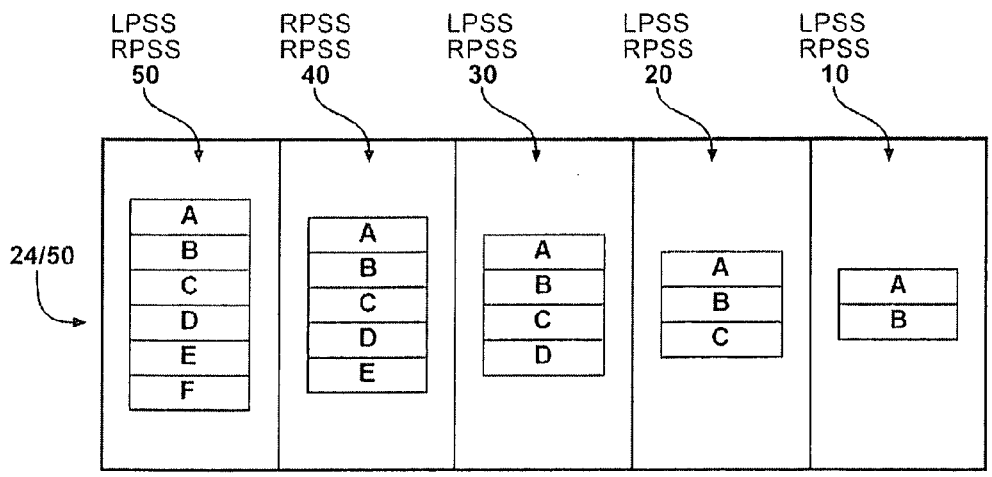
Figure 14:
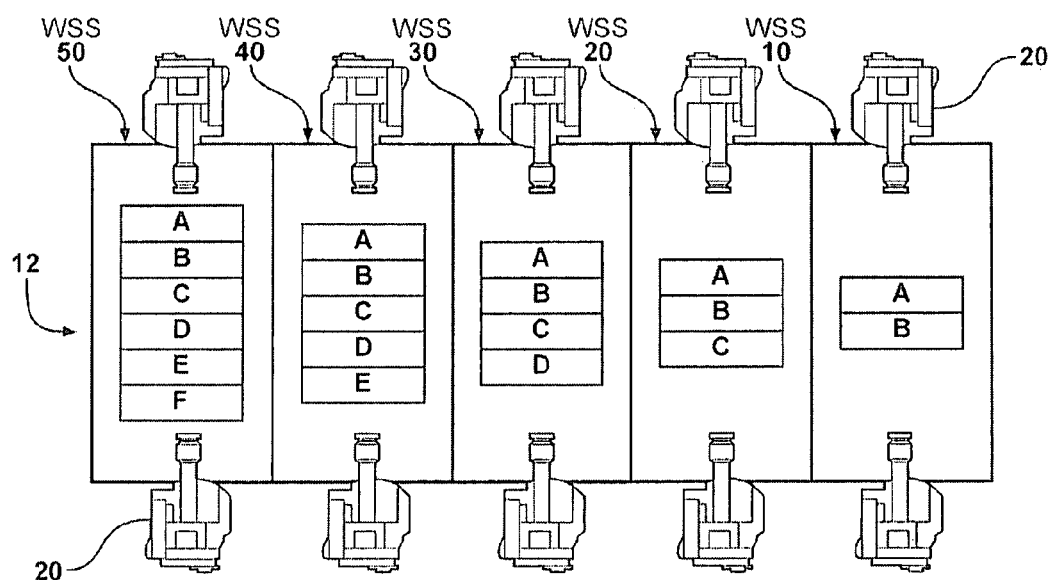

This shuttling and loading sequence is continued until welded components A/B are positioned at substation 10 of each pallet, welded components A/B/C are positioned at each substation 20 of each pallet, welded components A/B/C/D are positioned at substation 30 of each pallet, welded components A/B/C/D/E are positioned at substation 40 of each pallet, and welded components A/B/C/D/E/F are positioned at substation 50 of each pallet. Once each of the substations of each of the pallets is full, the sequence is as seen in FIG. 11 where, with respect to pallet 50, and with a fully loaded pallet 24 positioned in the weld station for welding of respective components A/B, A/B/C, A/B/C/D, A/B/C/D/E, and A/B/C/D/E/F, welded component subassembly A/B/C/D/E/F from RPSS50 is removed by robot 64 for placement in dunnage 74, welded component subassembly A/B/C/D/E at RPSS40 is moved to RPSS50 for addition of a component F, welded component subassembly A/B/C/D at RPSS30 is moved to RPSS40 for addition of a component E, welded component subassembly A/B/C at RPSS20 is moved to RPSS30 for addition of a component D, welded component subassembly A/B at substation 10 is moved to RPSS20 for addition of a component C, new components A/B are placed at RPSS10, and pallet 50 is shuttled back to a weld station for welding operations on the various component combinations as pallet 24 with fully welded components shuttles back to load/unload station 14.

It will be understood that, in each case, inventories of the appropriate components A, B, C, D, E, F are provided in appropriate racks or bins in row 74 and are loaded onto conveyor runs 70a/70b for retrieval from conveyor runs 70b/72b by the load robots, and the movement of the components between substations and the addition of components at the substations is performed utilizing load robots 58/60 at station 16 and load robots 32/34 at station 14. Unloading of welded component subassemblies ABCDEF from LPSS50 is performed at station 14 utilizing unload robots 36/38 with robot 36 retrieving the welded component subassembly ABCDEF from LPSS50, moving slidably along track 30 to track 40, and transferring the subassembly to robot 38 for delivery to dunnage 76. Unloading of welded component subassembly ABCDEF from RPSS50 is performed at station 16 utilizing unload robot 64 for delivery to dunnage 76.

It will be understood that the positioning of the various components at the various substations of the pallets is performed using dedicated tooling with tooling LAB/RAB designed to accommodate components A and B positioned at each pallet substation 10; tooling LABC/RABC designed to accommodate components A, B and C positioned at each pallet substation 20; tooling LABCD/RABCD designed to accommodate components A, B, C and D positioned at each pallet substation 30; tooling LABCDE/RABCDE designed to accommodate components A. B, C, D and E positioned at each pallet substation 40; and tooling LABCDEF/RABCDEF designed to accommodate components A, B, C, D, E and F positioned at each pallet substation 50.

It will further be understood that the robots 20 associated with each weld station substation may include positioning robots carrying positioning tooling such as the tooling 60 seen in FIG. 9, as well as welding robots carrying weld guns 62 as seen in FIGS. 8 and 10, and that robots carrying both positioning tooling and weld guns may also be employed.

Typical applications of the invention machine include the formation of body side inner right-hand and left-hand, front floor subassembly, center floor assembly, dash subassembly, cowl top and cowl side subassembly, rear wheel subassembly, rear pan subassembly, rear door left-hand and right-hand subassembly, front door left-hand and right-hand subassembly, lift gate and deck lid assembly, hood assembly, and closure hemming with respect to doors, hoods, decks and lift gates.

The invention high density welding machine has many advantages, chief of which is the ability to significantly reduce the required floor space for a particular job function. Further, the invention machine requires a minimum of manpower and a minimum of initial capital expenditure, and facilitates tooling maintenance and changeover since die tooling of the pallet not at the weld station is readily accessible for maintenance and changeover.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for welding motor vehicle components comprising:
   a weld station;
   a load/unload station;

a pallet mounted for reciprocal movement between the load/unload station and the weld station and having a plurality of successive pallet substations thereon for receipt of component subassemblies; and a transfer system proximate the load/unload station operative with the pallet positioned at the load/unload station to move the component subassembly at each substation to the next successive substation and add a further component to each moved subassembly so that the component subassembly at a particular pallet substation includes one more component than the subassembly at the immediately preceding substation and one less component than the component subassembly at the immediately succeeding substation.

2. The apparatus according to claim 1 wherein the transfer system includes robotic devices positioned proximate the load/unload station.

3. The apparatus according to claim 2 wherein the apparatus further includes a storage structure positioned proximate the load/unload station and storing inventories of components for use in forming the component subassemblies.

4. The apparatus according to claim 3 wherein the apparatus further includes a conveyor positioned between the storage structure and the load/unload station and including a run positioned proximate the storage structure for receipt of components from inventory and a run proximate the load/unload station for delivery of components to the load/unload station for loading onto the pallet substations by the transfer system.

5. The apparatus according to claim 3 wherein:
the pallet includes an initial substation, a final substation, and intermediate substations;
the transfer system is operative to move component subassemblies successively from the initial substation to the final substation; and
the transfer system is further operative to remove a final welded component subassembly from the final substation for use in further motor vehicle assembly processes.

6. The apparatus according to claim 1 wherein:
the load/unload station comprises a first load/unload station, the pallet comprises a first pallet, and the transfer system comprises a first transfer system; and
the apparatus further includes a second load/unload station, a second pallet mounted for reciprocal movement between the second load/unload station and the weld station and having a plurality of successive substations, and a second transfer system operative with the second pallet positioned at the second load/unload station to move the component subassemblies at each substation to the next successive substation and add a further component to each moved subassembly.

7. The apparatus according to claim 6 wherein the load/unload stations and the weld station are in linear alignment with the weld station positioned between the load/unload stations.

8. The apparatus according to claim 1 wherein the apparatus further includes tooling at each pallet substation configured to receive and accurately position the components of the component subassembly at that substation.

\* \* \* \* \*